Patented Aug. 8, 1944

2,355,410

UNITED STATES PATENT OFFICE 2,355,410

PROCESS FOR THE BROMINATION OF KETONES

Franz Bergel, Welwyn Garden City, England, assignor to Roche Products Limited, Welwyn Garden City, Hertfordshire, England No Drawing. Application June 5, 1942, Serial No. 445,997. In Great Britain June 24, 1941

6 Claims. (Cl. 260—488)

Ketones of the type

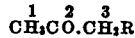

wherein R represents an alkyl, hydroxy alkyl or an esterified hydroxy alkyl group, are usually brominated in the 3 position to form monobromoketones by means of free bromine, sometimes in solvents. Thus methyl ethyl ketone is brominated mainly to 3-bromobutanone-2 (van Reymenant, Chemisches Zentralblatt, 1901, I, p. 95); acetobutyl alcohol, mainly to δ-bromo-δ-acetobutyl-alcohol (Bergmann and Miekeley, Lieb, Ann. d. Chem., 1923, 432, p. 341) and γ-acetopropyl acetate to γ-aceto-γ-bromopropyl alcohol acetate (Andersag and Westphal, Ber. d. deutschen Ges., 1937, 70, p. 2043). When sulphuryl chloride is used, chlorination occurs mainly in the same position with formation of the corresponding monochloroketones (cf. van Reymenant, loc. cit.).

The present invention provides a process which permits bromination of ketones of the above type directly by reacting sulphuryl chloride with the ketones in the presence of an alkali metal bromide, e. g., sodium bromide. The reaction may be completed by adding acetone to the mixture and heating it to 60° C. with stirring. Halogenation catalysts such as silica may also be used in small quantities.

The following examples in which the parts are by weight illustrate how the process of the invention may be carried into effect.

1. 100 parts of γ-acetopropyl alcohol acetate are mixed with 143.0 parts of anhydrous sodium bromide; 0.0175 part of pure silica (reprecipitated) may be added. The mixture is stirred vigorously and 90.3 parts of pure sulphuryl chloride are added gradually over a period of two hours. Sometimes cooling with water at 20° C. may be applied when the chloride is added too quickly. When the last drop of sulphuryl chloride has been added, stirring is continued for another hour. Then dry nitrogen is bubbled through for a further hour to remove all traces of sulphur dioxide, etc. 410 parts of dry acetone are next added and stirring continued for another hour, during which the temperature of the bath is raised to about 60° C. The mixture is allowed to cool with stirring and filtered from the solid. The solid is washed with ether and the whole filtrate taken up with more ether. The ether is washed with ice-cold water then with ice-cold sodium bicarbonate solution until no more carbon dioxide is evolved. More washing with ice-cold water is effected and finally the ether is taken off after drying over anhydrous sodium sulphate. The dark residue is submitted to a slow high vacuum distillation, in which the main bulk boils at 50–55° C./0.05 mm. A straw-coloured liquid is obtained, containing 35.5% of bromine (theoretical=35.9%). The product condenses with 5 - thioformylaminomethyl-2-methyl - 4 - aminopyrimidine to yield aneurin after working up in the usual manner. It should be noted that sulphuryl chloride may also be used in molecular proportions or in slight excess and the sodium bromide in excess of the molecular quantity, when in the main γ-aceto-γ-bromo propyl alcohol acetate is formed.

2. 25 parts of dry methyl ethyl ketone are stirred well with 71.5 parts of dry sodium bromide, after which 46.9 parts of pure sulphuryl chloride are added drop by drop without cooling. When the addition is complete, the stirring is continued for an hour, first at 20° C. and then at 50–60° C. Instead of warming the mixture, nitrogen may be bubbled through it to remove sulphur dioxide, etc. Finally 100–200 parts of acetone are added and the mixture is warmed with stirring at 60° C. for one hour. After cooling to 20° C., either ice-water may be added directly and the brominated ketone extracted with ether or the mixture is filtered first and the filter residue washed with ether and the filtrate taken up with more ether. The ether is washed with ice-water, sodium bicarbonate solution and ice-water again. After drying of the ether layer, the solvent is removed and the residue distilled, when 3-bromo-butanone-(2) boils at 56–60° C./30 mm. or 45–50° C./15 mm. The substance may sometimes still contain a small amount of chloroketone, but mostly all or over 90% is the bromoketone.

In order to identify the substance it may be condensed with thioacetamide to give trimethylthiazole, the picrate of which melts at 133–134° C. (cf. Beilstein, vol. XXVII, p. 19—M. Pt. 133° C.).

3. The process is carried out as in Examples 1 or 2, but with addition of 0.005 part of pure silica to the ketone and sodium bromide mixture.

4. 25 parts of methyl ethyl ketone, 71.6 parts of anhydrous sodium bromide and 0.005 part of pure silica are well stirred and 46.8 parts of sulphuryl chloride are added over a period of an hour without cooling. The stirring is continued for 30 minutes at 20° C., after which nitrogen is bubbled through for a further 30 minutes. The well-stirred mixture is then warmed at 50° C. for 1½ hours. It is worked up as in Example 1 and the brominated methyl ethyl ketone distills at 56–64° C./30 mm. It contains 48.8% of bromine and 4.2% of chlorine (theoretical=53% of bromine).

I claim:

1. A process for the manufacture of brominated ketones which comprises reacting a ketone of the general formula $CH_3CO.CH_2R$ in which R is a radical selected from the group consisting of alkyl, hydroxy alkyl and esterified hydroxy alkyl radicals, with sulphuryl chloride in the presence of an alkali metal bromide under anhydrous conditions.

2. A process for the manufacture of brominated ketones which comprises reacting a ketone of the general formula $CH_3CO.CH_2R$ in which R is a radical selected from the group consisting of alkyl, hydroxy alkyl and esterified hydroxy alkyl radicals, with sulphuryl chloride in the presence of an alkali metal bromide under anhydrous conditions and thereafter adding acetone and heating the mixture to 60° C. with stirring.

3. A process for the manufacture of brominated ketones which comprises reacting a ketone of the general formula $CH_3CO.CH_2R$ in which R is a radical selected from the group consisting of alkyl, hydroxy alkyl and esterified hydroxy alkyl radicals, with sulphuryl chloride in the presence of an alkali metal bromide in the presence of a halogenation catalyst under anhydrous conditions.

4. A process for the manufacture of brominated ketones which comprises reacting a ketone of the general formula $CH_3CO.CH_2R$, in which R is a radical selected from the group consisting of alkyl, hydroxy alkyl and esterified hydroxy alkyl radicals, with sulphuryl chloride in the presence of an alkali metal bromide under anhydrous conditions in the presence of silica.

5. A process for the manufacture of γ-aceto-γ-bromopropyl alcohol acetate which comprises reacting γ-acetopropyl alcohol acetate with sodium bromide and sulphuryl chloride in the presence of silica under anhydrous conditions, adding acetone and heating to 60° C.

6. A process for the manufacture of 3-bromobutanone-2 which comprises reacting methyl ethyl ketone with sodium bromide and sulphuryl chloride in the presence of silica under anhydrous conditions, adding acetone and heating to 60° C.

FRANZ BERGEL.